United States Patent
Lochmann

(10) Patent No.: US 7,052,034 B2
(45) Date of Patent: May 30, 2006

(54) ANTI-SUBMARINING AIRBAG FOR VEHICLE SEAT

(75) Inventor: Hans Lochmann, Niedernhausen (DE)

(73) Assignee: Key SaFETY Systems, Inc., Sterling Heights, MI (US)

( * ) Notice: Subject to any disclaimer, the term of this patent is extended or adjusted under 35 U.S.C. 154(b) by 212 days.

(21) Appl. No.: 10/868,081

(22) Filed: Jun. 15, 2004

(65) Prior Publication Data
US 2004/0262888 A1 Dec. 30, 2004

(30) Foreign Application Priority Data
Jun. 25, 2003 (DE) ................. 103 28 603

(51) Int. Cl.
*B60R 21/16* (2006.01)
(52) U.S. Cl. .................................. 280/728.1
(58) Field of Classification Search ............ 280/728.1, 280/730.1, 743.1
See application file for complete search history.

(56) References Cited

U.S. PATENT DOCUMENTS

| | | | |
|---|---|---|---|
| 5,324,072 A | 6/1994 | Olson et al. | |
| 5,421,607 A | 6/1995 | Gordon | |
| 5,556,128 A * | 9/1996 | Sinnhuber et al. | ........ 280/730.2 |
| 5,695,242 A | 12/1997 | Brantmann et al. | |
| 5,704,637 A | 1/1998 | Matsuura et al. | |
| 6,293,581 B1 * | 9/2001 | Saita et al. | .............. 280/730.2 |
| 6,497,429 B1 * | 12/2002 | Matsumoto | .............. 280/730.2 |
| 6,543,804 B1 * | 4/2003 | Fischer | .................. 280/730.2 |
| 6,854,763 B1 * | 2/2005 | Dinsdale et al. | ............ 280/737 |
| 2004/0046375 A1 | 3/2004 | Lincoln et al. | |

FOREIGN PATENT DOCUMENTS

| | | |
|---|---|---|
| DE | 4137 691 A1 | 11/1991 |
| DE | 199 83 630 T1 | 11/2001 |
| WO | WO 00/38954 | 7/2000 |

* cited by examiner

*Primary Examiner*—Faye M. Fleming
(74) *Attorney, Agent, or Firm*—Lonnie Drayer

(57) ABSTRACT

An airbag module for incorporation in a vehicle seat has an airbag with an inflator located inside the airbag. The inflator has a first free end and an opposite second free end. The second free end of the inflator has a connection section projecting from the airbag. At least one part of the interior surface of the airbag comes into contact with the two free ends of the inflator when the airbag is inflated to brace the inflator in the airbag and to seal the airbag in a gas-tight manner at least in the region of the projecting connection section.

18 Claims, 2 Drawing Sheets

ANTI-SUBMARINING AIRBAG FOR VEHICLE SEAT

FIELD OF THE INVENTION

The present invention relates to an airbag module, in particular for an airbag that can be incorporated into a vehicle seat to prevent submarining of a seat occupant during a crash.

BACKGROUND OF THE INVENTION

Submarining is a term used in the vehicle occupant restraint field to refer to the phenomena that occurs when the occupant of a vehicle seat slides forward under his seat belt when there is a rapid deceleration of the vehicle during a crash. One approach to combating the submarining phenomena is to cause the front portion of the vehicle seat to be elevated at the onset of a rapid vehicle deceleration, thus minimizing the phenomena. It is known that the front portion of the seat cushion can be elevated using an airbag incorporated into the seat structure, for example as taught in U.S. Pat. No. 5,695,242. It is further desirable to present the occupant of a vehicle seat from sliding laterally from the seat during a crash, and the use of an airbag incorporated in a seat to prevent this phenomena is disclosed in US 2004/0046375 A1. US 2004/0046375 A1 discloses the incorporation in the structure of a vehicle seat of a tubular shaped airbag, in the inside of which a inflator is arranged, projecting at least partly out of the airbag, in order to be connected with an airbag module control unit. In these types of systems it is problematic, however, to seal the airbag in the region of the inflator in such a manner that no gas losses occur. The seals, as known from the prior art, are extremely cost-intensive due to the complexity of the components.

SUMMARY OF THE INVENTION

The present invention provides an airbag module for incorporation in a vehicle seat comprises an airbag and a inflator located therein which comprises a first free end and an opposite second free end to which a connection section projecting from the airbag is arranged, whereby at least one part of the interior surface of the airbag comes into contact with the two ends of the inflator when the airbag is inflated to secure the inflator in the airbag and to seal the airbag in a gastight manner at least in the region of the ends of the projecting connection section of the inflator. The inflator has a substantially cylindrical configuration, at the second end of which the connection section is a plug or contact or connector. In the inflated state the interior surface of the airbag exerts a force onto the two free ends of the inflator, whereby the force has force components which are opposed to the free ends of the inflator. The absolute value of the forces acting upon the free ends of the inflator is substantially identical. Due to the force exerted upon the inflator via the interior surface of the airbag, the interior surface of the airbag is pushed or pressed against the free ends of the inflator. The gas is at least partly held in the tubular airbag for a predetermined length of time, so that the tubular airbag maintains its inflated or full state for a predetermined length of time, since it seals itself. The inflator fulfils a sealing function at each of its contact surfaces with the airbag in its inflated state, so that the airbag is also sealed in the region of the first free end of the inflator. In this way, the cost of manufacturing the airbag module can be lowered. Expensive components for the sealing of the airbag module in the region of the connection section are not required or no additional sealing elements are necessary.

BRIEF DESCRIPTION OF THE DRAWINGS

FIG. 3b is a sectional view of FIG. 3a.

DETAILED DESCRIPTION OF THE INVENTION

Figure 1:
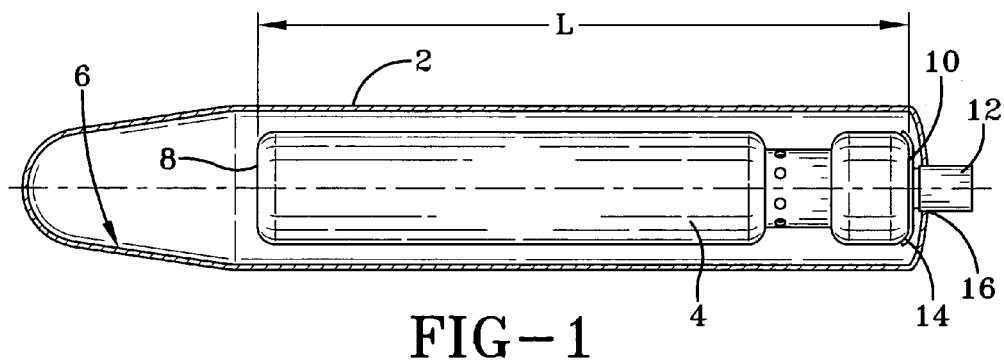
FIG. 1 is a cross-sectional view of a first embodiment of the airbag module according to the invention in a non-inflated state.

The arrangement shown in FIG. 1 shows a first embodiment of an airbag module according to the invention in a non-inflated state. The airbag module comprises an airbag 2, in the transverse direction of which a substantially cylinder-shaped inflator 4 is arranged inside the airbag 2.

At least one free end of the inflator preferably has the surface configuration of a cylinder or a ball segment surface or of a partly bent surface. In this case the at least one free end of the inflator conforms to the interior surface of the airbag. The operational safety of the airbag module is thus increased, since the forces acting upon the airbag or the airbag material in the region of the at least one free end of the inflator can be distributed evenly or over a greater surface. Depending on the shape of the airbag, the at least one free end of the inflator can have a cylinder, ball segment or bent surface.

The airbag 2 is substantially a section of a continuous tube, which in the inflated state has a substantially circular cross section. The airbag 2 can comprise one or several layers of an appropriate material, whereby in the case of a multi-sheet or multi-layer structure has at its interior surface a sealing layer, preferably a polyurethane or rubber layer or a synthetic material is arranged on an interior surface 6 of the airbag. Due to this type of multi-layered airbag, the airbag module can be used in regions in which an increased gas tightness and an increased resisting force is required against outside influences, such as sharp metal edges or the like. To increase the gas tightness a second layer can be a coating, which can be arranged preferably on the inside or outside of the airbag. This coating can be a polyurethane or silicon coating, which has very low gas permeability. Due to the use of this type of standard continuous tube, the cost of manufacturing the airbag and thus of the airbag module can be lowered significantly. The tubular airbag is preferably seamless, whereby on the basis of the absence of a seam, the operational safety is improved, since the risk of a seam bursting is not present.

The substantially cylinder-shaped inflator 4 of length L comprises at one of its two free ends a first free end of the inflator 8. Opposite the first free end of the inflator 8 a second free end of the inflator 10 is located on the inflator 4. From the second free end of the inflator 10 a connection section 12 projects in an axial direction from the inflator 4. The connection section 12 for instance comprises a connector, which can be connected with an airbag module control unit, to ignite or activate the inflator. At least one part of the connection section 12 projects from the airbag 2. It is preferred that between the second free end of the inflator and the airbag interior surface a contact element is arranged, for instance in the shape of a plain washer 14. Due to the plain washer or the contact element, the operational safety of the airbag module can be increased, since the sealing effect is improved in the region of the connection section. This is the result of the fact that in this region the inflator has a large surface, which fits well with the interior surface of the airbag, so that the entire sealing surface is enlarged.

The distance between the two free ends of the inflator is preferably greater than the theoretical internal width of the inflated airbag in the longitudinal direction of the inflator, preferably by 1.1 to 1.3 times, in particular preferably by 1.2 times. In this case the distance between the two free ends of the inflator represents substantially the longitudinal projection of the inflator in the airbag. The internal width of the inflated airbag in the longitudinal direction of the inflator is the distance of the two interior surfaces, which come into contact with the two free ends of the inflator. The theoretical internal width is thus the distance between these two interior surfaces in the inflated state of the airbag, whereby the inflator is not arranged in the airbag. In a tubular airbag, which has a circular cross section, the theoretical internal width thus corresponds to the internal diameter of the tube. Should the inflator be arranged in this type of tubular airbag, then the inflator forces the tube or the tubular airbag into an elliptical cross-sectional form. Effective sealing is achieved in this case with the ratio of the distance of the two free ends of the inflator to the theoretical internal width being 1.2.

To avoid damage to the interior surface 6 of the airbag 2 or the airbag material, the inflator 4 on the first and second free ends of the inflator 8, 10 is provided with a rounded surface, such as the configuration of a ball segment surface.

In the region of the connection section 12, the second free end of the inflator 10 must have a sufficiently large surface, which fits well with the interior of the tube, to achieve the desired sealing function. To improve this effect, a plain washer 14 is provided on the second free end of the inflator in the axial direction of the inflator 4 between the latter and the interior surface 6 of the airbag 2. The plain washer 14 has a greater surface than the second free end of the inflator 10, whereby the sealing surface is increased, which leads to an improved sealing effect.

Figure 2:
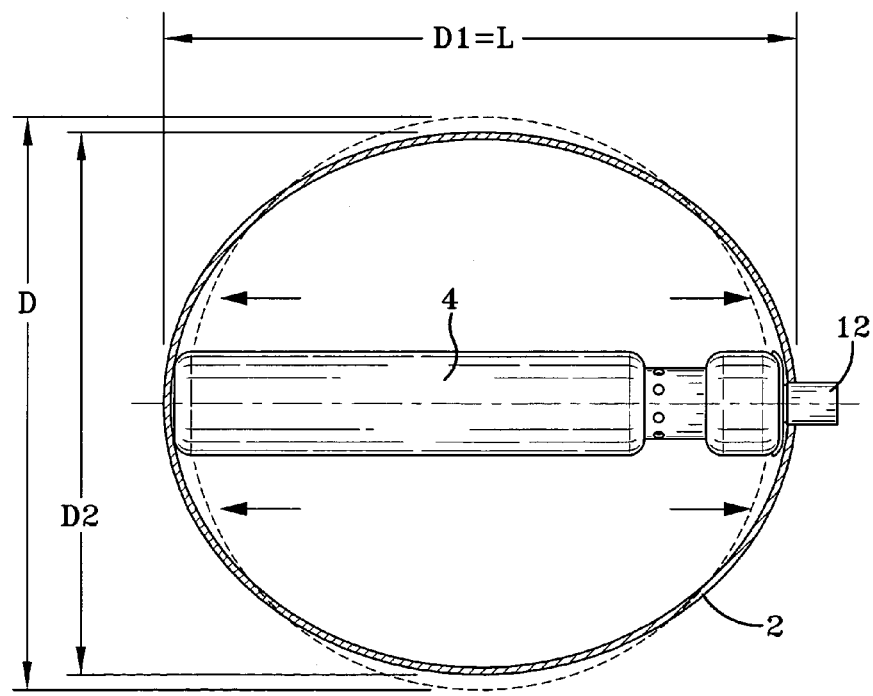
FIG. 2 is a cross-sectional view of the airbag module according to the invention according to FIG. 1 in an inflated state.

FIG. 2 shows the airbag module according to FIG. 1 in an inflated state. In this case the tube tends to assume a theoretical end position. Due to the transversely installed inflator 4, the airbag 2 is however forced into a partly elliptical cross-sectional shape. In other words, the length L of the inflator 4 between the two free ends of the inflator 8, 10 is greater than the theoretical diameter D of the inflated airbag 2, if the inflator 4 is not installed therein. The airbag 2 thus inflates in an elliptical manner in the region in which the inflator 4 is arranged. Consequently, in the region transverse to the longitudinal axis of the inflator 4, the airbag 2 reaches merely a diameter D2, which is smaller than the theoretical diameter D. Due to this ratio of dimensions the inflator 4 is clamped by the airbag 2, whereby opening points are sealed at the airbag 2 in the region of the two free ends of the inflator 8, 10, i.e. in particular the access opening 16, through which the connection section 12 extends.

For the inflator 4, a inflator for instance with a distance L of 120 mm can be used, whereby consequently an airbag 2 with an internal diameter of approximately 100 mm is used. In any case the distance L should be 5 to 25 mm greater than the diameter D.

Figure 3A:
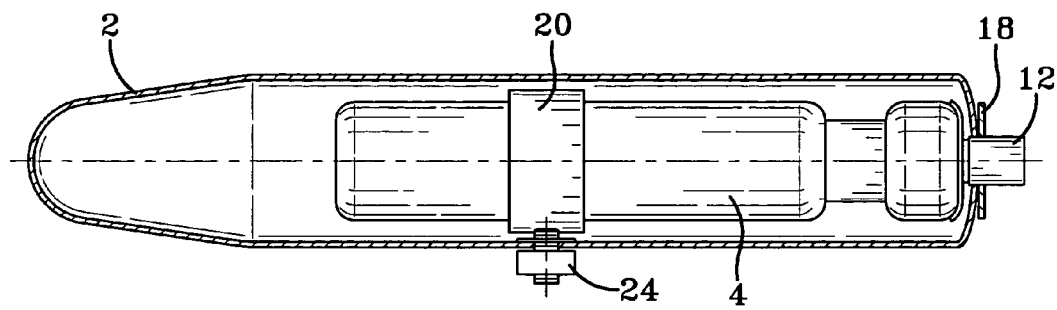
FIG. 3a shows a second embodiment of the airbag module according to the invention in a non-inflated state.

FIG. 3a shows a second embodiment of the airbag module according to the invention, whereby the airbag 2 and the inflator 4 are substantially identical to those of the first embodiment. In this embodiment, however, the region of the airbag 2, through which the connection section 12 extends, is secured by a toothed lock washer 18 to the second free end of the inflator 10 of the inflator 4 to fasten the inflator to the airbag. The sealing effect or tightness can thus be increased, since the airbag material is pushed against the second free end of the inflator in the region of the projecting connection section. This ensures that the inflator 4 remains in position during transport until its installation in a vehicle. Alternatively, instead of the toothed lock washer 18, an E ring, a nut or a similar fastening device can be used. Due to the fastening of the inflator in, or to, the airbag by corresponding fastening means or a corresponding fastening device, an operationally safe airbag module can be provided, since a change in position of the inflator relative to the airbag can be prevented during assembly.

Figure 3B:
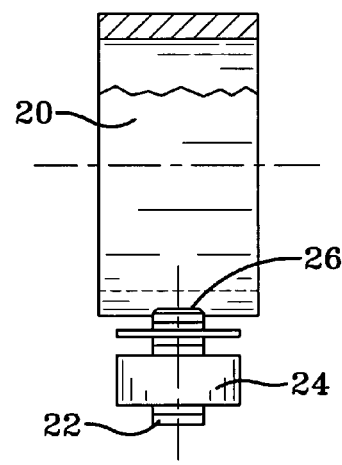

Alternatively or additionally, during transport and installation also, the inflator 4 is secured to the airbag 2 by a fastening device, preferably a clamp 20, which at least partly encloses the inflator and secures the latter to the airbag, as shown in detail in FIG. 3b. The clamp 20 surrounds the inflator 4 in an at least partly radial manner and at its outer side is provided with a threaded bolt 22, which extends outwardly through the airbag 2. At this point the airbag 2 is pushed against the outer side of the clamp 20 by a nut 24 and thus sealed off. When the airbag module is triggered, a set breaking point 26 ruptures in the clamp 20, to ensure an unhindered inflation or filling of the airbag 2. In this manner, a safe positioning of the inflator relative to the airbag in its uninflated state is ensured. To this effect the clamp has a set breaking point. When the airbag module is activated, this set breaking point ruptures, so as not to obstruct the airbag during deployment. It is also conceivable to secure the inflator to the airbag with easily detachable fastening means, such as Velcro.

Figure 4:
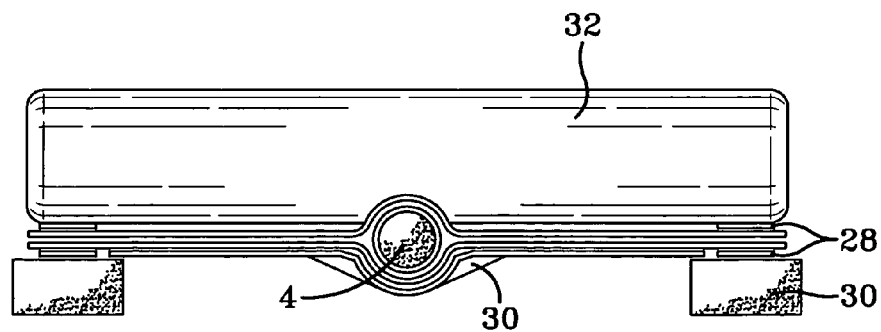
FIG. 4 shows the airbag module according to the invention in an installed state.

FIG. 4 shows the airbag module according to the invention in an installed state. The open ends of the tubular airbag are sealed in a gastight manner by locking clamps 28 and connected to the frame 30 of the vehicle. These locking clamps or crimps 28 lock the open front face ends of the airbag 2, in that a section of the open end of the airbag 2 is folded over or down towards the airbag middle, whereby said folded over end is then locked by the locking clamps 28. Opposite the frame 30 the seat upholstery 32 is arranged above the airbag module. To hold the inflator 4 in position, i.e. transverse to the airbag longitudinal axis, until its activation, a device, e.g. in the form of a sheet metal dish 34 is arranged on the seat underside. The airbag module or the inflator 4 is placed in this sheet-metal dish 34 and preferably pressed into the sheet-metal dish 34 by the above-lying seat upholstery 32. In this way the inflator 4 is secured such that rattling noises during driving can be avoided. In addition, the sheet-metal dish 34 creates a support or backing, from which the airbag 2 can extend in the direction of the seat upholstery 32, whereby submarining movements of the vehicle occupant can be avoided in the event of a frontal crash.

The airbag preferably substantially maintains its original diameter and its original length when in an inflated state. Due to the consistent original diameter and the consistent original length of the airbag, the space requirement or the space demand for the inflated airbag can be predetermined, whereby an exact arrangement of the vehicle structure surrounding the airbag can follow.

The aforementioned description is exemplary rather that limiting. Many modifications and variations of the present invention are possible in light of the above teachings. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

The invention claimed is:

1. An airbag module for incorporation in a vehicle seat, comprising an airbag having an inflator located therein, the inflator having a first free end and an opposite second free end, to which a connection section projecting from the airbag is attached, a distance between the two free ends of the inflator is greater than a theoretical internal width of the inflated airbag in the longitudinal direction of the inflator, whereby at least one part of an interior surface of the airbag comes into contact with the two free ends of the inflator when the airbag is inflated, to brace the inflator in the airbag and to seal the airbag in a gas-tight manner at least in the region of the projecting connection section.

2. The airbag module for incorporation in a vehicle seat according to claim 1, whereby a distance between the two free ends of the inflator is 1.1 to 1.3 times greater than a theoretical internal width of the inflated airbag in the longitudinal direction of the inflator.

3. The airbag module for a incorporation in a vehicle seat according to claim 1, wherein at least one free end of the inflator has a surface configuration of a cylinder or a ball segment surface or a partly bent surface.

4. The airbag module for incorporation in a vehicle seat according to claim 1, wherein between the second free end of the inflator and the interior surface of the airbag there is disposed a contact element.

5. The airbag module for incorporation in a vehicle seat according to claim 4, wherein the contact element has the shape of a plain washer.

6. The airbag module for incorporation in a vehicle seat according to claim 1, wherein the airbag is tubular.

7. The airbag module for incorporation in a vehicle seat according to claim 2, wherein the airbag is tubular.

8. The airbag module for incorporation in a vehicle seat according to claim 3, wherein the airbag is tubular.

9. The airbag module for incorporation in a vehicle seat according to claim 1, wherein the airbag has an original diameter and an original length and substantially maintains the original diameter and the original length when inflated.

10. The airbag module for incorporation in a vehicle seat according to claim 7, wherein the airbag has an original diameter and an original length and substantially maintains the original diameter and the original length when inflated.

11. The airbag module for incorporation in a vehicle seat according to claim 8, wherein the airbag has an original diameter and an original length and substantially maintains the original diameter and the original length when inflated.

12. The airbag module for incorporation in a vehicle seat according to claim 1, wherein the interior surface of the airbag if provided with a sealing layer.

13. The airbag module for incorporation in a vehicle seat according to claim 10, wherein the interior surface of the airbag if provided with a sealing layer.

14. The airbag module for incorporation in a vehicle seat according to claim 11, wherein the interior surface of the airbag if provided with a sealing layer.

15. The airbag module for incorporation in a vehicle seat according to claim 1, further comprising a fastening device to fasten the inflator to the airbag.

16. The airbag module for incorporation in a vehicle seat according to claim 15, wherein the fastening device is a toothed lock washer or an E ring, which secures the connection section to the airbag.

17. The airbag module for incorporation in a vehicle seat according to claim 15, wherein the fastening device is a clamp, which at least partly encloses the inflator and secures the latter to the airbag.

18. The airbag module for incorporation in a vehicle seat according to claim 17, whereby the clamp has a set breaking point.

* * * * *